United States Patent
Ho

(10) Patent No.: US 6,636,376 B1
(45) Date of Patent: Oct. 21, 2003

(54) DISC DRIVE RESONANCE DISTURBANCE CANCELLATION FILTER

(75) Inventor: Hai T. Ho, Westminster, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 368 days.

(21) Appl. No.: 09/689,312

(22) Filed: Oct. 12, 2000

Related U.S. Application Data

(60) Provisional application No. 60/158,881, filed on Oct. 12, 1999.

(51) Int. Cl.[7] ............................................. G11B 5/596
(52) U.S. Cl. .................................................. 360/77.02
(58) Field of Search ........................... 360/77.04, 77.02

(56) References Cited

U.S. PATENT DOCUMENTS

| | | | |
|---|---|---|---|
| 5,072,318 A | 12/1991 | Yu | 360/77.02 |
| 5,608,586 A | 3/1997 | Sri-Jayantha | 360/77.04 |
| 5,610,487 A | 3/1997 | Hutsell | 318/560 |
| 6,061,200 A * | 5/2000 | Shepherd et al. | 360/77.04 |
| 6,421,198 B1 * | 7/2002 | Lambaerts et al. | 360/77.04 |

OTHER PUBLICATIONS

"Advanced Methods for Repeatable Runout Compensation"by Alexei H Sacks, et al., IEEE *Transactions on Magnetics*, vol. 31, No. 2, Mar. 1995.

* cited by examiner

*Primary Examiner*—David Hudspeth
*Assistant Examiner*—Mitchell Slavitt
(74) *Attorney, Agent, or Firm*—Westman, Champlin & Kelly

(57) ABSTRACT

An apparatus and method for canceling nonrepeatable runout position error in a disc drive. Pursuant to the method, a frequency of a specified nonrepeatable runout disturbance is determined. A position error signal indicative of a position of a read/write head relative to a track is received. A signal is generated based upon the frequency of the specified nonrepeatable runout disturbance and the received position error signal. The generated signal is applied to the servo loop. Applying the generated signal to the servo loop cancels a component of the position error signal arising from the specified nonrepeatable runout disturbance. In an illustrative embodiment, applying the generated signal to the servo loop produces a notch in an error sensitivity function relating the position error signal to a general nonrepeatable runout disturbance, the notch being centered at the frequency of the specified nonrepeatable runout disturbance.

18 Claims, 8 Drawing Sheets

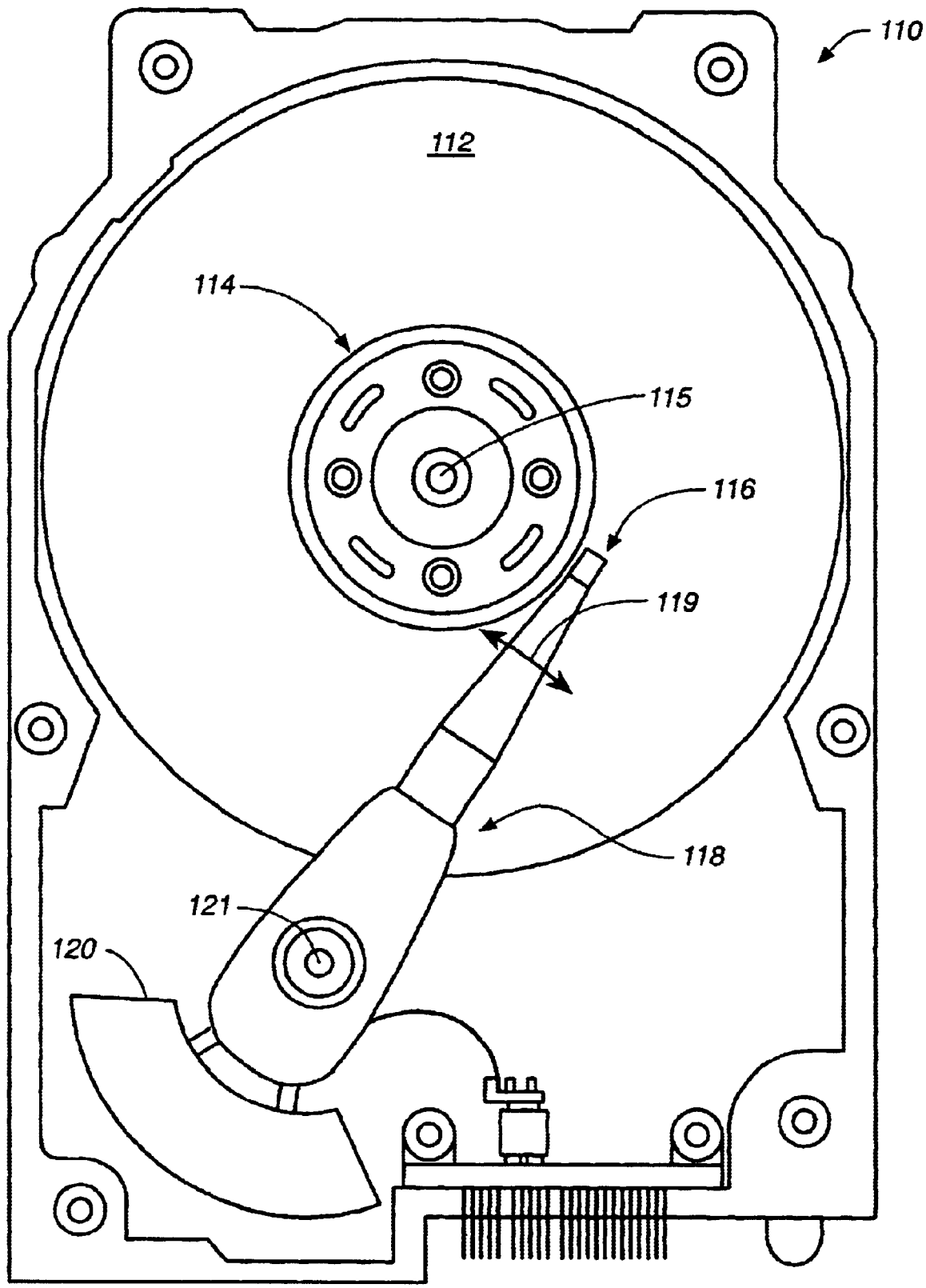
FIG._1

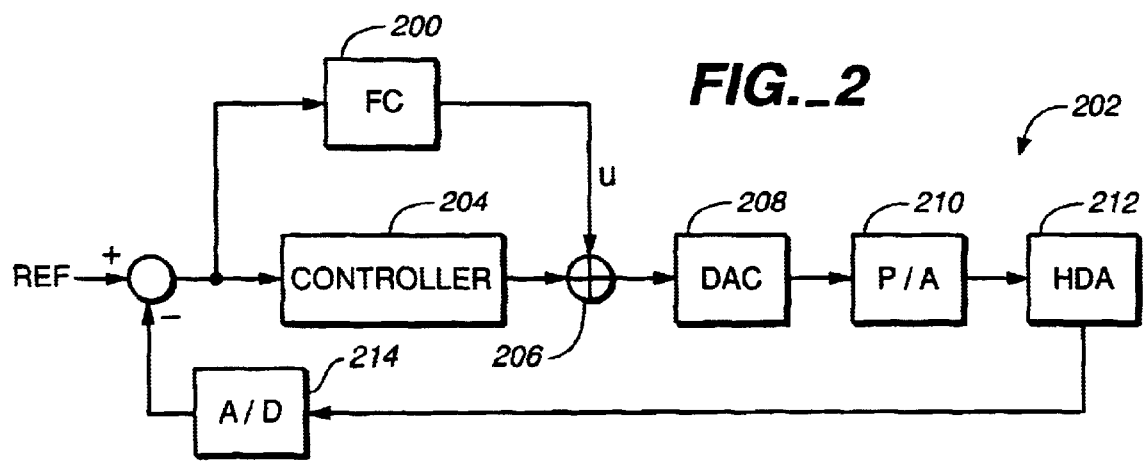
FIG._2
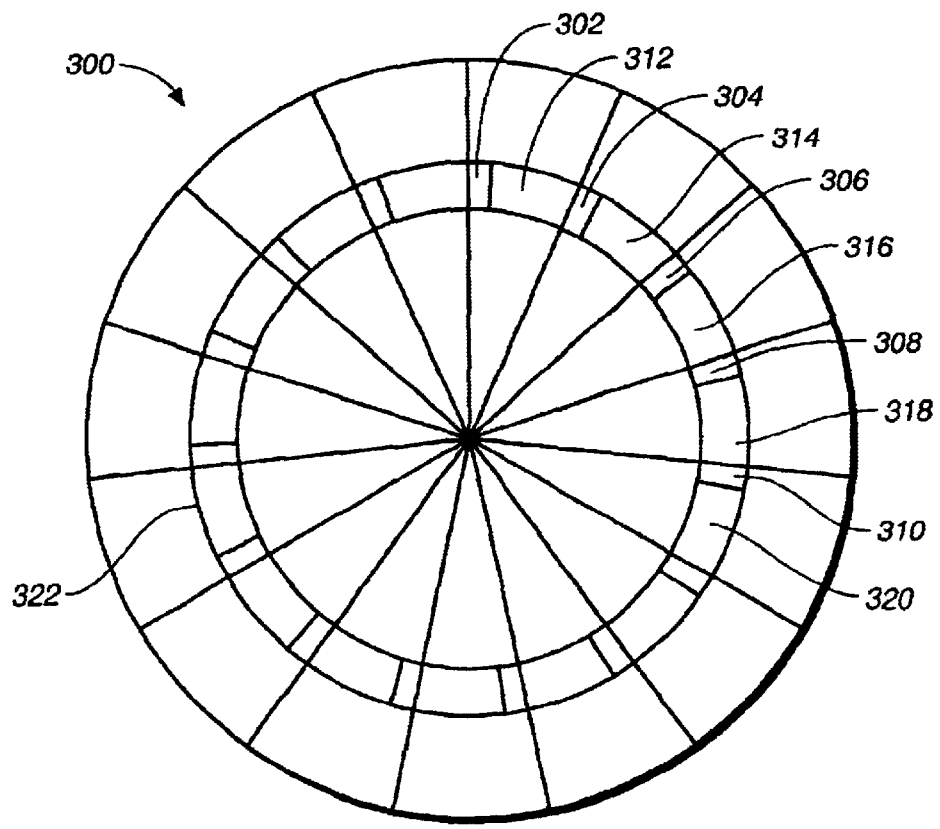
FIG._3

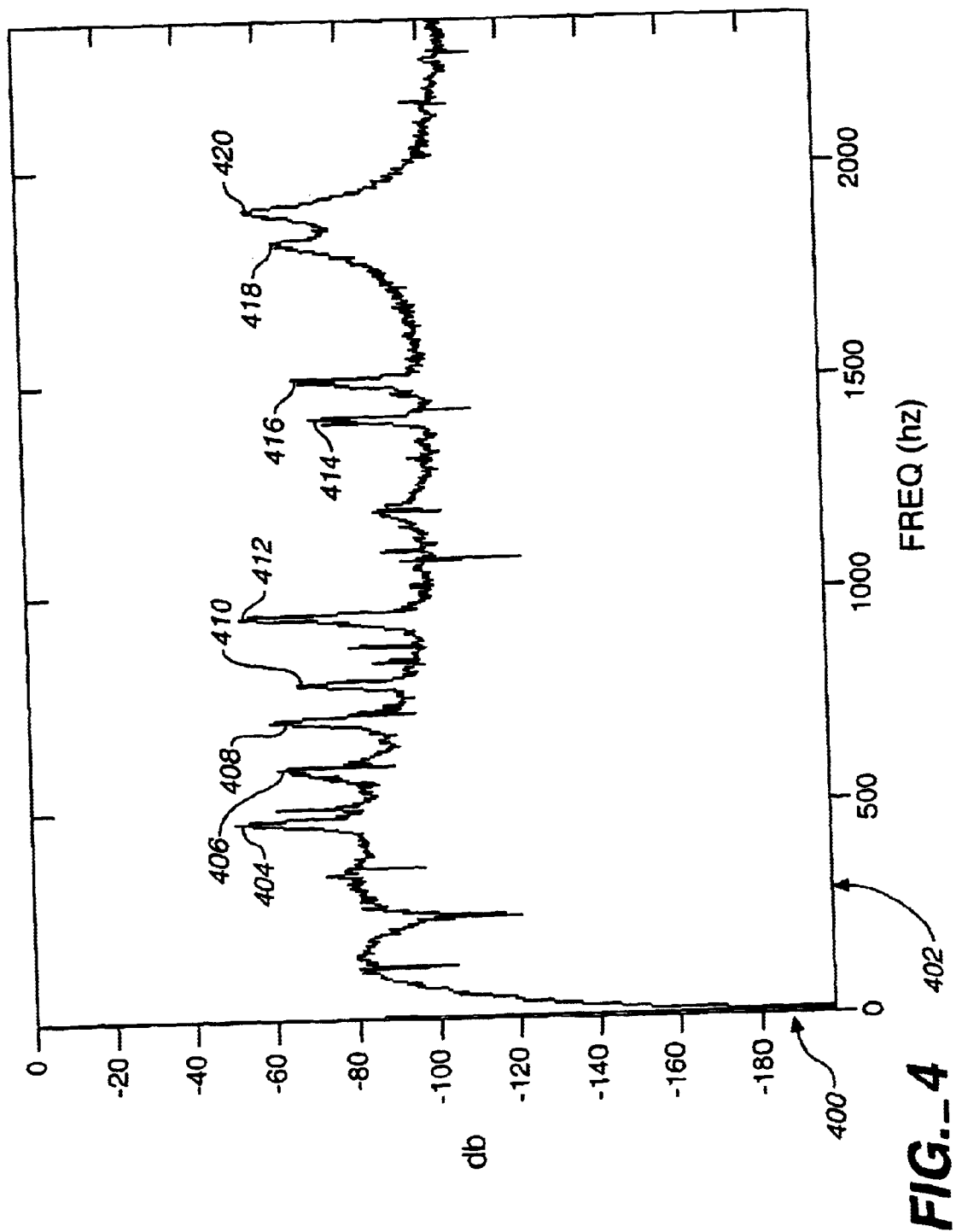
FIG._4

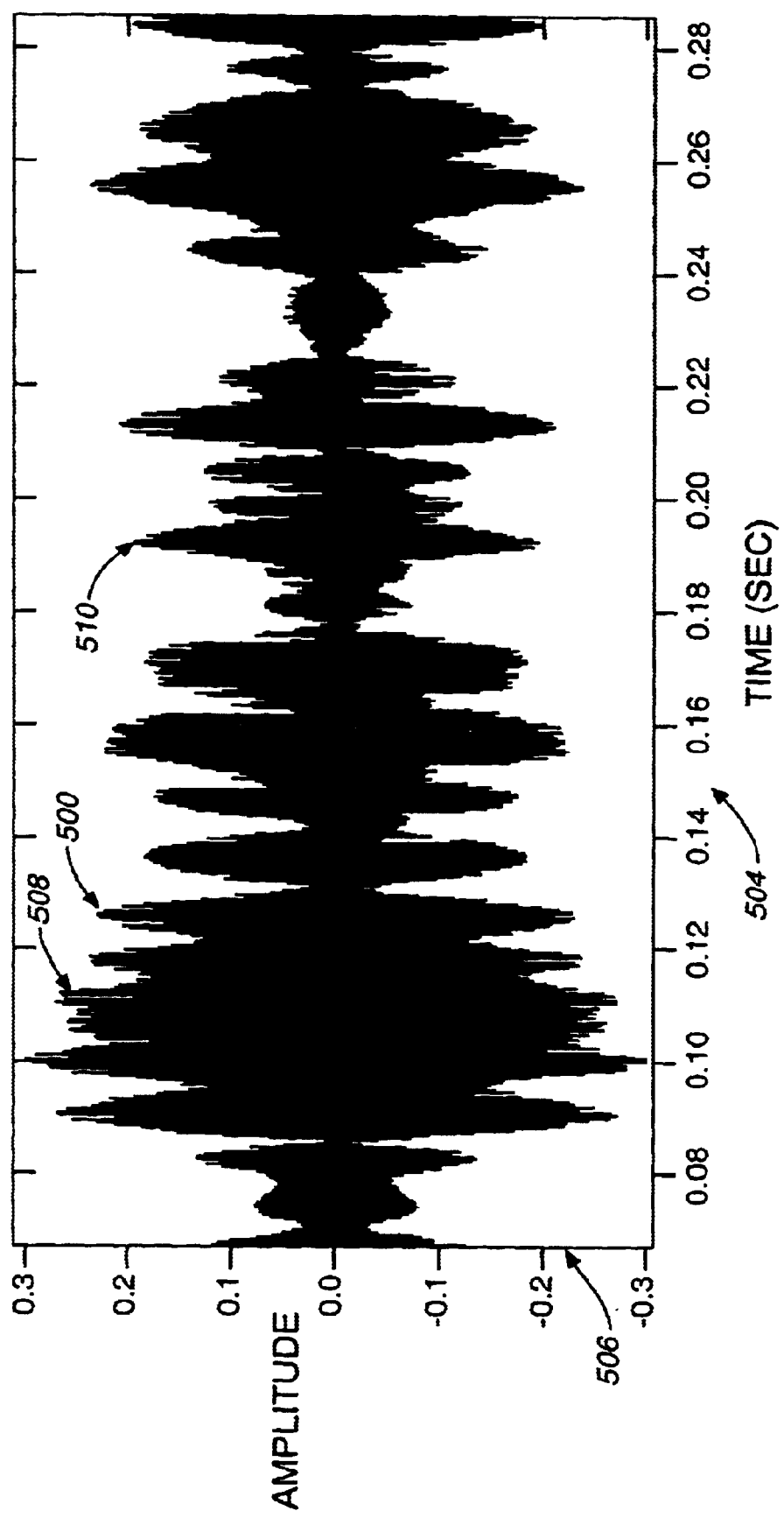
FIG._5

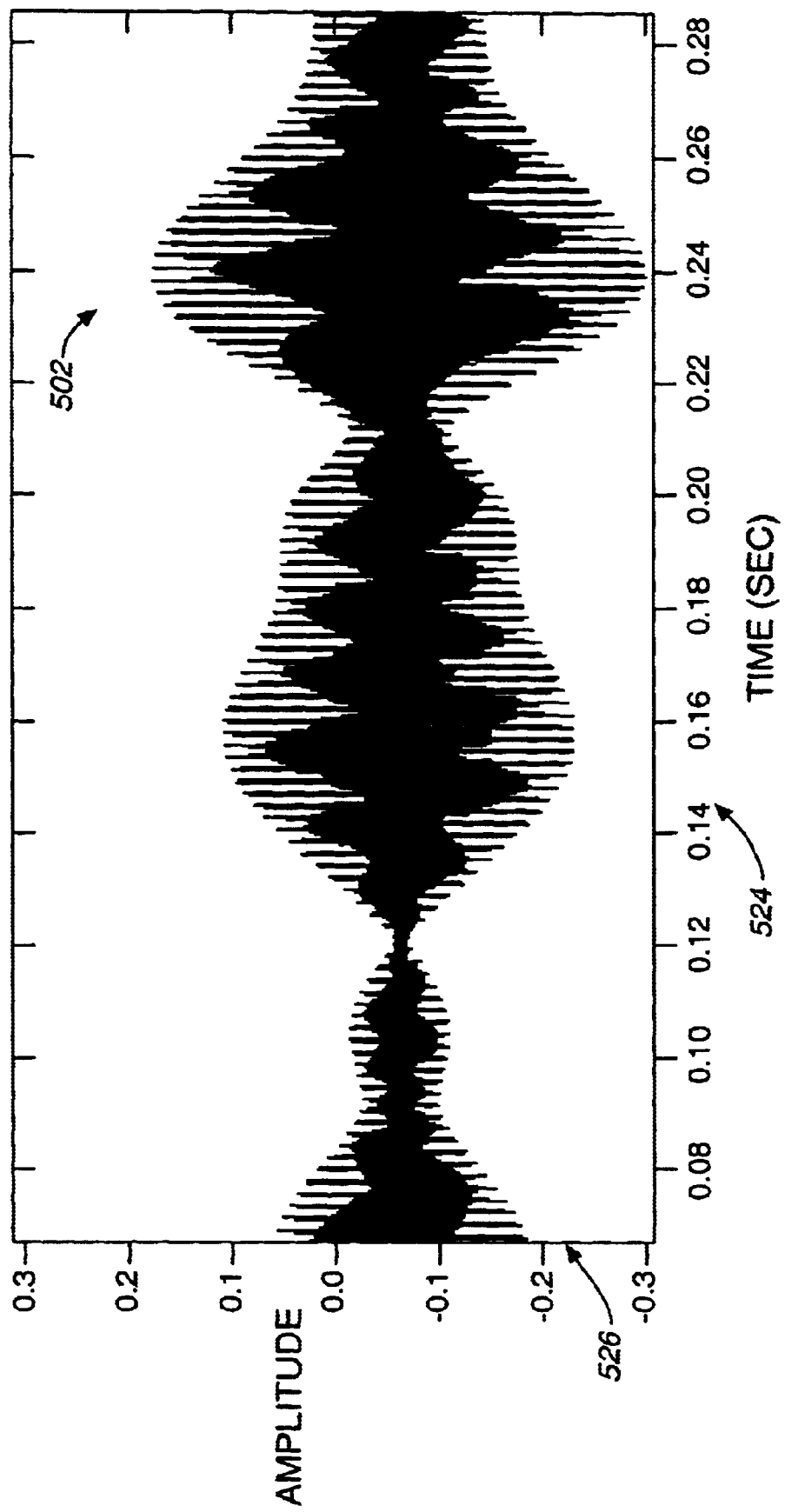
FIG._6

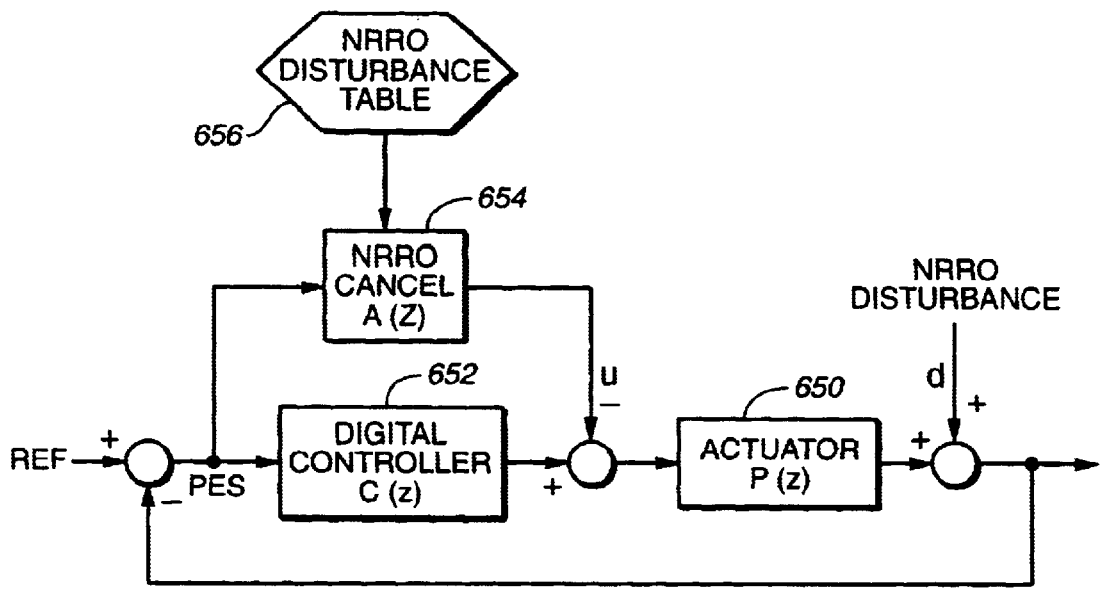
FIG._7
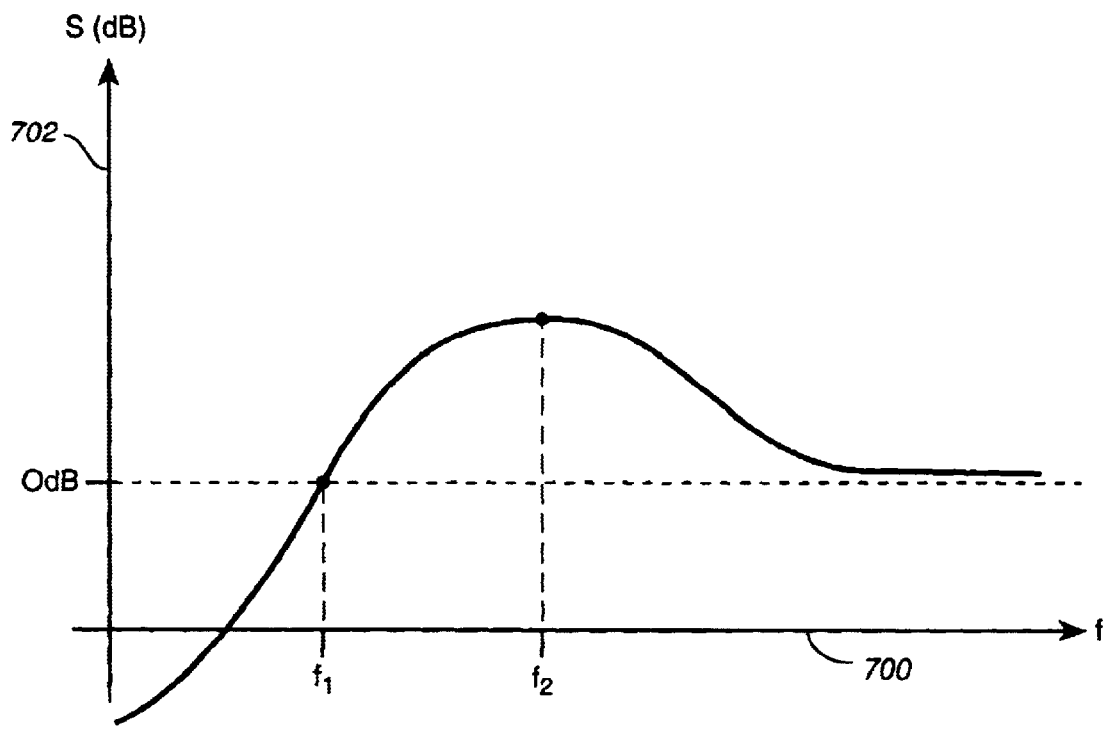
FIG._8

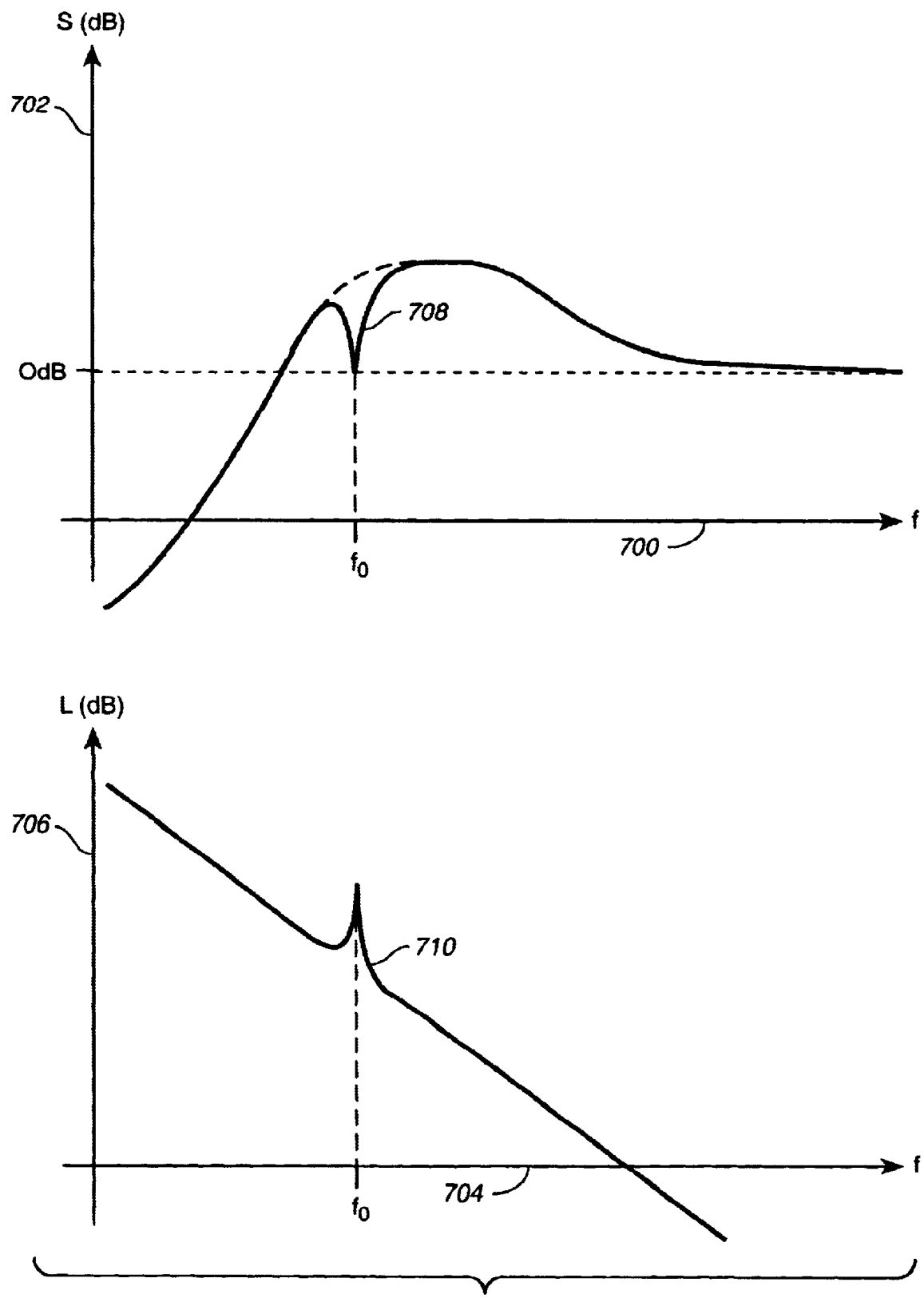
FIG._9

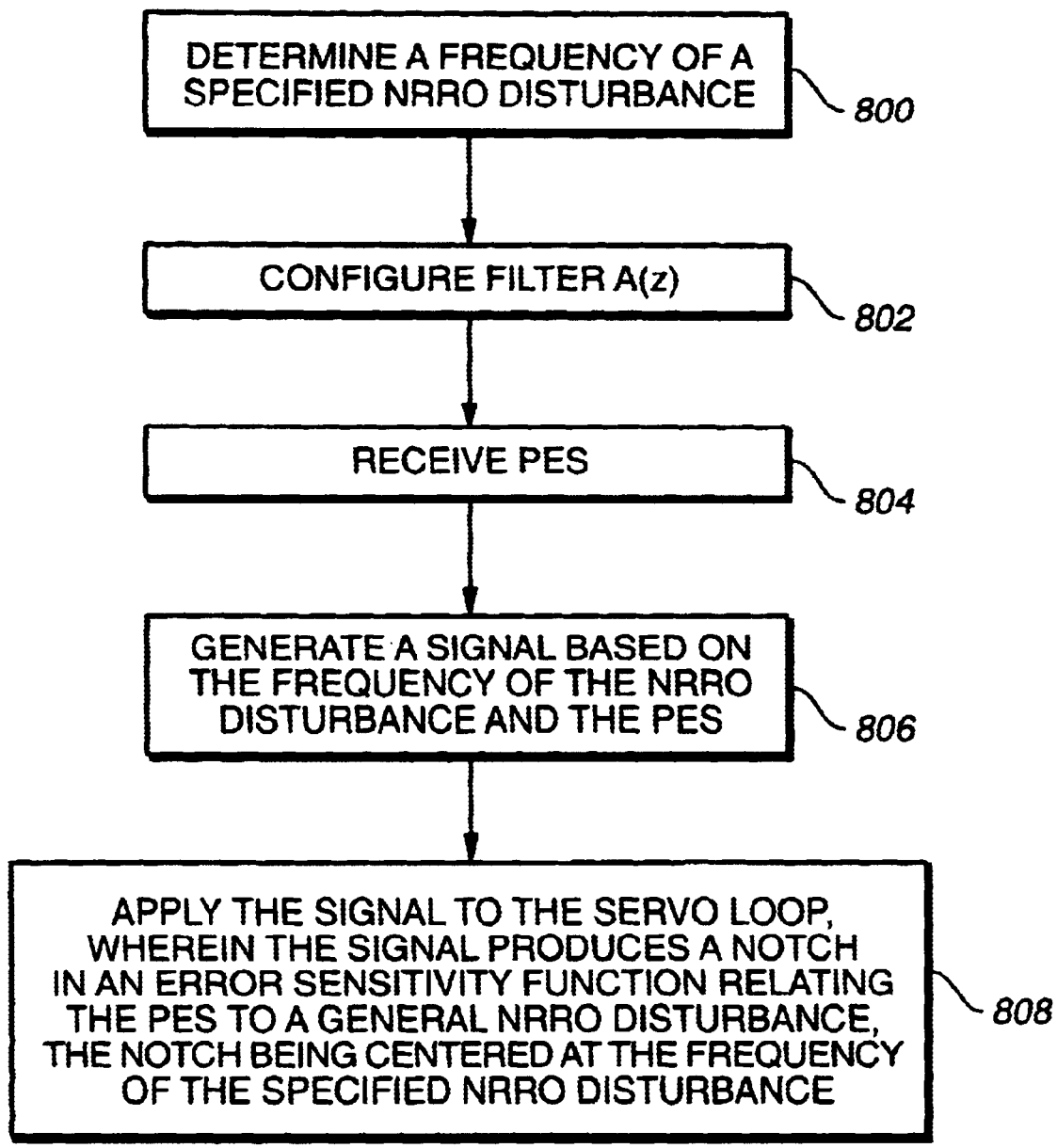
FIG._10

DISC DRIVE RESONANCE DISTURBANCE CANCELLATION FILTER

CROSS-REFERENCE TO RELATED APPLICATION

This application claims the benefit of U.S. Provisional Patent Application No. 60/158,881, entitled "FREQUENCY SCALABLE PEAKING FILTER FOR NRRO TRACKING," filed on Oct. 12, 1999.

FIELD OF THE INVENTION

The present invention relates generally to disc drive data storage systems. More particularly, the present invention relates to canceling resonance disturbances in disc drive systems.

BACKGROUND OF THE INVENTION

In a computer disc drive, data is stored on a disc in concentric tracks. In disc drives with relatively high track densities, a servo feedback loop is used to maintain a head over the desired track during read and write operations. This is accomplished utilizing prerecorded servo information either on a dedicated servo disc or on angularly spaced sectors that are interspersed among the data on the disc. During track following, the servo information sensed by the head is demodulated to generate a position error signal (PES), which provides an indication of the position error of the head away from the track center. The PES is then converted into an actuator control signal, which is fed back to an actuator to position the head.

In general, there are two forms of head positioning errors: repeatable and non-repeatable. Repeatable errors, which are generally caused by mechanical irregularities in the structure of the disc drive or errors introduced when writing the servo tracks, can be predicted and therefore theoretically can be cancelled out as they occur. In general, these repeatable runout errors (RRO) are removed by introducing a compensation signal into the servo loop that cancels the repeatable positioning error. Techniques for generating such compensation signals are generally referred to as feedforward cancellation.

Nonrepeatable runout (NRRO) can account for 30–40% of total runout. Feedforward cancellation is much more difficult to implement for nonrepeatable runout errors. Nonrepeatable runout disturbances can arise as a result of a variety of factors and the characteristics of the disturbance often vary depending on the source of the disturbance. Disc flutter disturbances have high energy concentrated at specific frequencies (typically between approximately 500 and 1000 Hz). On the other hand, suspension windage-induced disturbances occur at higher frequencies and have wider bandwidths. Also, unlike repeatable runout errors, nonrepeatable runout errors do not occur with predictable magnitudes, frequencies or phases. In fact, the magnitude, frequency and phase of a nonrepeatable runout error signal generally change with each rotation of the disc.

One system, discussed by Yu in U.S. Pat. No. 5,072,318, attempts to cancel a nonrepeatable runout error by adaptively changing a cancellation signal at each sector of the disc. Specifically, Yu uses a least squares algorithm to adaptively change the frequency, phase, and amplitude of the nonrepeatable runout cancellation signal at each sector.

Because Yu uses a least squares algorithm to determine the amplitude, frequency and phase of the cancellation signal, it takes time for the Yu algorithm to converge on the proper amplitude, frequency and phase. This delay in converging on the amplitude, frequency and phase of the nonrepeatable runout error causes the produced cancellation signal to be less than ideal. Also, because the feedforward scheme described by Yu uses an algorithm that includes frequency search, it results in a system that is adaptive, nonlinear and time-varying. Thus, the system is not scalable and is prone to divergence for larger learning rates and for certain disturbance frequencies.

The present invention provides a solution to this and other problems and offers other advantages over the prior art.

SUMMARY OF THE INVENTION

The present invention relates to canceling resonance disturbances in disc drive systems.

One embodiment of the present invention is directed to a method of canceling nonrepeatable runout position error. Pursuant to the method, a frequency of a specified nonrepeatable runout disturbance is determined. A position error signal indicative of a position of a read/write head relative to a track is received. A signal is generated based upon the frequency of the specified nonrepeatable runout disturbance and the received position error signal. The generated signal is applied to the servo loop. Applying the generated signal to the servo loop cancels a component of the position error signal arising from the specified nonrepeatable runout disturbance.

In one embodiment of the above method, applying the generated signal to the servo loop produces a notch in an error sensitivity function relating the position error signal to a general nonrepeatable runout disturbance, the notch being centered at the frequency of the specified nonrepeatable runout disturbance.

In a further embodiment of the above method, the signal is generated according to the equation:

$$A(z) = \frac{u}{PES} = \frac{z^2\left[\frac{\mu_o}{\alpha}\cos(\phi)\right] - z\left[\frac{\mu_o}{\alpha}\cos(\phi + \omega_o T)\right]}{\frac{z^2}{\eta} - z[2\cos(\omega_o T)] + \eta},$$

where u is the generated signal, PES is the position error signal, z is the z transform, $\omega_0$ is the frequency of the specified nonrepeatable runout disturbance, $\mu_0$ is the width of the notch, $\eta$ is the depth of the notch, $\alpha$ is a magnitude of a nominal closed loop gain of the servo loop at the frequency $\omega_0$, $\phi$ is a nominal closed loop phase response of the servo loop at the frequency $\omega_0$, and T is a sampling period.

Another embodiment of the present invention is directed to a disc drive having an actuator, a servo controller and a filter. The actuator operates in a servo loop to position a read/write head relative to a track on a disc surface. The servo controller receives a position error signal indicative of a position of the read/write head relative to a track on the disc surface and provides a control signal to the actuator based upon the position error signal. The filter receives the position error signal and provides a cancellation signal to the servo loop based upon the received position error signal and a frequency of a predetermined nonrepeatable runout disturbance. The compensation signal is adapted to cancel a component of the position error signal arising from the predetermined nonrepeatable runout disturbance.

In one embodiment of the above-described disc drive, the cancellation signal is adapted to produce a notch in an error sensitivity function relating the position error signal to a general nonrepeatable runout disturbance. The notch is centered at the frequency of the predetermined nonrepeatable runout disturbance.

In an illustrative embodiment of the above-described disc drive, the cancellation signal is calculated according to the equation:

$$A(z) = \frac{u}{PES} = \frac{z^2\left[\frac{\mu_o}{\alpha}\cos(\phi)\right] - z\left[\frac{\mu_o}{\alpha}\cos(\phi + \omega_o T)\right]}{\frac{z^2}{\eta} - z[2\cos(\omega_o T)] + \eta},$$

where u is the cancellation signal, PES is the position error signal, z is the z transform, $\omega_0$ is the frequency of the predetermined nonrepeatable runout disturbance, $\mu_0$ is the width of the notch, $\eta$ is the depth of the notch, $\alpha$ is a magnitude of a nominal closed loop gain of the servo loop at the frequency $\omega_0$, $\phi$ is a nominal closed loop phase response of the servo loop at the frequency $\omega_0$, and T is a sampling period.

These and various other features as well as advantages which characterize the present invention will be apparent upon reading of the following detailed description and review of the associated drawings.

BRIEF DESCRIPTION OF THE DRAWINGS

FIG. 1 is a plan view of a disc drive suitable for use with the present invention.

FIG. 2 is a block diagram of a servo loop with a feed-forward cancellation system.

FIG. 3 is a top view of a disc showing a sector layout used in the present invention.

FIG. 4 is a frequency spectrum of a nonrepeatable runout error.

FIG. 5 is a graph of a component of the nonrepeatable runout error over time.

FIG. 6 is a graph of a second component of the nonrepeatable runout error over time.

FIG. 7 is a simplified block diagram of a servo loop with feedforward cancellation under the present invention.

FIG. 8 is a graphical representation of a representative error sensitivity function.

FIG. 9 is a graphical representation of a representative error sensitivity function and corresponding open-loop gain resulting from implementation of the present invention.

FIG. 10 is a flow chart representing a method of canceling nonrepeatable runout position error according to an illustrative embodiment of the present invention.

DETAILED DESCRIPTION OF ILLUSTRATIVE EMBODIMENTS

FIG. 1 is a plan view of a typical disc drive 110. Disc drive 110 includes a disc pack 112, which is mounted on a spindle motor (not shown) by a disc clamp 114. Disc pack 112, in one preferred embodiment, includes a plurality of individual discs which are mounted for co-rotation about a central axis 115. Each disc surface on which data is stored has an associated head-gimbal assembly (HGA) 116 which is mounted to an actuator 118 in disc drive 110. The actuator assembly shown in FIG. 1 is of the type known as a rotary moving coil actuator and includes a voice coil motor shown generally at 120. As used herein, the term actuator assembly will refer to the combination of voice coil motor 120, actuator 118 and head-gimbal assembly 116. Voice coil motor 120 rotates actuator 1 18 with its attached head-gimbal assemblies 116 about a pivot axis 121 to position head-gimbal assemblies 116 over desired data tracks on the associated disc surfaces, under the control of electronic circuitry housed within disc drive 110.

More specifically, actuator 118 pivots about axis 121 to rotate head-gimbal assemblies 116 generally along an arc 119 which causes each head-gimbal assembly 116 to be positioned over a desired one of the tracks on the surfaces of discs in disc pack 112. Head-gimbal assemblies 116 can be moved from tracks lying on the innermost radius, to tracks lying on the outermost radius of the discs. Each head-gimbal assembly 116 has a gimbal which resiliently supports a slider relative to a load beam so that the slider can follow the topography of,the disc. The slider, in turn, includes one or more transducers, which are utilized for encoding flux reversals on, and reading flux reversals from, the surface of the disc over which it is flying.

FIG. 2 is a block diagram of a feedforward cancellation system 200 in a servo loop. Because the precise structure of the servo loop is not significant to the present invention, servo loop 202 is shown in a simplified form. Those skilled in the art will appreciate that servo loops are more complex than the simple diagram of FIG. 2.

In FIG. 2, servo loop 202 includes a servo controller 204 that receives a reference signal (REF) indicating the desired position for a head on the disc. Based on the reference signal, digital controller 204 generates a digital control value that passes through a cancellation summing node 206 (described further below) and into digital-to-analog converter 208. The digital control value is converted into an analog current by digital-to-analog converter 208 and the analog current is amplified by a power amplifier 210 to produce an actuator control current. The actuator control current is provided to a voice coil motor in a head-disc assembly (HDA) 212 and causes the voice coil motor to move based on the magnitude and polarity of the current. As the voice coil motor moves, head-gimbal assemblies attached to the voice coil motor move across the disc thereby changing the positions of the heads relative to tracks on the disc.

Using servo patterns stored on the disc, a head generates an analog signal that indicates the distance from the head to the track center. The analog signal is provided to an analog-to-digital converter 214, which forms a digital signal from the analog signal. The digital signal is then combined with the reference signal to produce a position error signal (PES) that is fed back to controller 204. Controller 204 uses the position error signal to generate a new digital control value. In particular, controller 204 generates a digital value designed to bring the heads toward the desired track position.

The position error signal is also provided to feedforward cancellation component 200, which generates a cancellation signal for the next sector based on the PES of the current sector. This cancellation signal is provided to cancellation summing node 206, which sums the cancellation signal with the control value generated by controller 204.

In embedded servo systems, the servo information is stored in sectors along the data track. FIG. 3 provides a top view of a disc 300 showing servo sectors 302, 304, 306, 308, and 310 interspersed among data fields 312, 314, 316, 318, and 320 along a track 322. Note that FIG. 3 is not drawn to scale and that most discs have many more servo fields. For example, in one embodiment of the present invention, there are 120 servo fields per track.

Nonrepeatable runout errors can be seen by examining the frequency spectrum of the position error signal measured over several sectors of the disc. An example of such a spectrum is shown in FIG. 4, where the amplitude of the position error signal is shown in decibels along vertical axis 400 and frequency is shown along horizontal axis 402. In FIG. 4, the different modes of the nonrepeatable runout error appear as peaks 404, 406, 408, 410, 412, 414, 416, 418, and 420 in the spectrum.

The peaks shown in FIG. 4 do not remain fixed. Instead, these peaks shift over time as the frequencies of the individual modes of the nonrepeatable runout errors change. It is this frequency shifting that makes it difficult to cancel nonrepeatable runout errors.

As shown in FIGS. 5 and 6, the amplitude of each mode of the nonrepeatable errors also changes over time. The changes in the amplitude of the nonrepeatable runout error can be seen in the graphs of FIGS. 5 and 6, which show the amplitude of two modes of the nonrepeatable runout error as a function of time. Mode 500, shown in FIG. 5, represents a 1.7 kilohertz mode of the nonrepeatable runout error and mode 502, shown in FIG. 6, represents a 460 hertz mode of the nonrepeatable runout error. In FIGS. 5 and 6, time is shown along horizontal axes 504 and 524, respectively, and amplitude is shown along vertical axes 506 and 526, respectively. As can be seen in FIGS. 5 and 6, the amplitudes of both modes of the nonrepeatable runout error signal vary considerably as a function of time such that the error signals appear as amplitude modulated signals. For example, peak 508 is much larger than peak 510 for mode 500. Because of this modulation in the amplitude, it is difficult to converge quickly on an appropriate cancellation signal under the prior art.

As discussed above, the prior art attempted to track these changes in frequency and amplitude by using adaptive feedforward cancellation to cancel the nonrepeatable runout error. Adaptive feedforward cancellation generates a correction value at each sector that is added to the servo loop. The prior art thereby adjusts the amplitude, frequency and phase of the nonrepeatable runout cancellation signal at each sector. When adaptively changing the amplitude, frequency and phase of the cancellation signal, the prior art does not attempt to measure the amplitude, frequency or phase of the nonrepeatable runout error directly. Instead, the prior art uses the position error signal to generate adaption factors for changing the amplitude, frequency and phase. When generating such adaption values, the prior art must use an adaptive strategy that allows for quick convergence on the new amplitude, frequency and phase of the nonrepeatable runout error while still maintaining stability in the servo system. Because of this, the convergence rate is limited and at times, the nonrepeatable runout is not completely cancelled.

The servo loop of FIG. 2 may be simplified by combining elements and assigning a single gain to the combined elements. An example of a simplified block diagram is shown in FIG. 7 where an actuator block 650 with a gain of P(z) is shown in place of digital-to-analog component 208, power amplifier 210, head-disc assembly 212 and analog-to-digital converter 214. Controller 204 of FIG. 2 is shown as controller block 652 in FIG. 7 and has a gain of C(z). The feedforward cancellation circuit is shown as NRRO Cancel block 654 and has a gain of A(z).

In FIG. 7, the repeatable runout disturbance is shown as a disturbance d that is added to the position information output by actuator 650. The feedforward cancellation signal is shown as u, which is subtracted from the control signal produced by controller 652.

The dominant component of the nonrepeatable runout disturbance is a cosine function with arbitrary amplitude and phase, which can be represented by the following relationship:

$$d_0(k)=A(k)*\cos((\omega_0 kT+\theta(k)) \tag{EQ. 1}$$

where k is the sampling index, A is the amplitude of the disturbance, $\omega_0$ is the frequency of the disturbance, T is the sampling period and $\theta$ is the phase of the disturbance. Using this relationship, and knowing that A, $\omega_0$ and $\theta$ do not really remain constant, but continuously vary with disc rotation, the digital value of the feedforward control signal can be represented as follows:

$$u(k)=a(k)\cos((\omega_0 kT)+b(k)\sin(\omega_0 kT) \tag{EQ. 2}$$

The present invention is discussed herein with respect to a single-input, single-output (SISO) discrete time stochastic system. It will be appreciated that the invention is also applicable to other systems. All transfer functions and signals are expressed in the discrete time domain by using the sampling time index, k, and the unit delay operator $q^{-1}$.

FIG. 8 shows a graphical representation of a typical error sensitivity function S as a function of the frequency f of a nonrepeatable runout disturbance. The frequency f is shown along the x axis 700 while error sensitivity function S is shown in dB along the y axis 702. The error sensitivity function S relates the magnitude of the position error signal arising from a nonrepeatable runout disturbance to the magnitude of the nonrepeatable runout disturbance itself. Thus the error sensitivity function can be represented as $$S=PES/d_0 \tag{EQ. 3}$$

It can be seen from FIG. 8 that below a frequency $f_0$ the value of error sensitivity function S is below 0 dB. Above $f_1$, S is above 0 dB. Thus, below $f_1$, the magnitude of the NRRO disturbance is attenuated in the position error signal. Above $f_1$, the magnitude of the NRRO disturbance is magnified in the position error signal. The value of error sensitivity function S is at a maximum at a frequency $f_2$, above which the value of sensitivity function S rolls off and again approaches 0 dB. From FIG. 7 it can be seen that the position error signal can be represented by the following equation:

$$PES(k)=S(q^{-1})d_0(k)-P(q^{-1})S(q^{-1})u(k) \tag{EQ. 4}$$

According to an illustrative embodiment of the present invention, NRRO cancellation controller 654 puts one or more "notches" in error sensitivity function S at a frequency (s) that is determined by measuring the closed-loop frequency response of the servo loop to determine the frequency characteristics of one or more nonrepeatable runout disturbances. FIG. 9 shows a graphical representation of the same error transfer function S as depicted in FIG. 8, but with a notch 708 implemented at a center frequency $f_0$. The notch is designed to filter out (decrease) the effect of the nonrepeatable runout disturbance on the position error signal at the center frequency $f_0$. As a result of the notch, the magnitude of the position error signal arising from a nonrepeatable runout disturbance centered at frequency $f_0$ is decreased.

FIG. 9 also shows the open loop gain of the servo loop as a result of the notch in the error sensitivity function. The frequency f is shown along the x axis 704 while the open-loop gain L is shown in dB along the y axis 706. The error sensitivity function S is related to the open-loop gain of the servo loop by the relation:

$$S = \frac{1}{1+L} \quad \text{(EQ. 5)}$$

Thus, the notch in the error sensitivity function at center frequency $f_0$ results in an "anti-notch" 710 in the open-loop gain at the same frequency, as can be seen in FIG. 9.

Using the gradient of steepest descent and normalization of the quadrature sin input vector, the normalized least means square (NLMS) update law computes the terms a(k) and b(k) in EQ.2 for each position error signal sample during track-following as follows:

$$a(k+1) = a(k) + \frac{\mu_o}{\alpha}\cos(\omega kT + \phi)PES(k) \quad \text{(EQ. 6)}$$

$$b(k+1) = b(k) + \frac{\mu_o}{\alpha}\sin(\omega_o kT + \phi)PES(k) \quad \text{(EQ. 7)}$$

where $$0 < \mu_0 < 4 \quad \text{(EQ. 8)}$$

$$\alpha = |P(e^{j\omega T})S(e^{j\omega T})|_{\omega = \omega_0} \quad \text{(EQ. 9)}$$

$$\phi = arg\{P(e^{j\omega T})S(e^{j\omega T})\}|_{107 - \omega_0} \quad \text{(EQ. 10)}$$

$\mu_0$ represents the learning rate is and controls the width of the notch produced in the error sensitivity function. $\alpha$ represents the magnitude of the nominal closed-loop gain of the servo loop, that is the gain of the servo loop without the feedforward filter 654 employed. $\phi$ represents the phase response of the nominal closed-loop gain of the servo loop. The parameters $\alpha$ and $\phi$ are determined by measuring the frequency response of the closed loop and are used as "a priori" knowledge. This produces a "loop matching" effect. The resulting NLMS update law of Equations 6 and 7 exhibits dependable exponential convergence of the parameters a(k) and b(k). Prior art runout cancellation filters do not employ this "loop matching", and can therefore be prone to divergence for larger learning rates. The normalizing of the learning rate with $\alpha$ results in a consistent convergence rate for any targeted frequency $\omega_0$. A larger $\mu_0$ allows better tracking of A(k) and $\theta$ (k).

The inventor of the present invention has discovered that the nonrepeatable runout filter described above, appearing to be adaptive-nonlinear-time-varying, in fact provides a second-order, linear, time-invariant (LTI) system. This linear, time-invariant system can be described by the following relation:

$$A(z) = \frac{u}{PES} = \frac{z^2\left[\frac{\mu_o}{\alpha}\cos(\phi)\right] - z\left[\frac{\mu_o}{\alpha}\cos(\phi + \omega_o T)\right]}{\frac{z^2}{\eta} - z[s\cos(\omega_o T)] + \eta} \quad \text{(EQ. 11)}$$

where z is the z transform and $\eta$ is the depth of the notch in the error sensitivity function. Like the parameters $\omega_0$, $\alpha$ and $\phi$, the $\eta$ parameter is determined by measuring the frequency response of the closed loop and is used as "a priori" knowledge.

The open-loop gain of the servo circuit with NRRO cancellation filter 654 deployed can be represented as:

$$L(z) = P(z)C(z) + P(z)A(z) \quad \text{(EQ. 12)}$$

Thus, the error sensitivity function can be represented as:

$$S(z) = \frac{1}{1 + P(z)C(z) + P(z)A(z)} \quad \text{(EQ. 13)}$$

The NRRO cancellation filter 654 implemented with EQ. 11 is a stabilizing peaking filter. It is scalable because it can be deployed at substantially any frequency including near or at cross-over frequencies and resonance frequencies. Because of the "loop matching effect," EQ. 11 reliably produces a notch on the error transfer function S at the intended frequency $\omega_0$.

In an illustrative embodiment of the present invention, NRRO cancellation filter 654 has an associated NRRO disturbance table 656 that stores the parameters $\alpha$, $\phi$, $\mu_0$, $\omega_0$ and T for each nonrepeatable runout disturbance to be accounted for. Illustratively, this table 656 is implemented as a computer storage medium that can either be integrated with NRRO cancellation filter 654 or can be external to filter 654 with suitable connection.

FIG. 10 is a flow chart representing a method of canceling nonrepeatable runout position error according to an illustrative embodiment of the present invention. At step 800, the frequency $\omega_0$ of a specified nonrepeatable runout disturbance is determined. In an illustrative embodiment, the frequency $\omega_0$ is determined by measuring the closed-loop frequency response of the servo loop.

According to the present invention, this measurement can be performed in the factory during the manufacture of the drive or it can be performed in the field on an installed drive. At step 802, the position error signal is received. At step 804, a signal is generated based upon the frequency $\omega_0$ of the specified nonrepeatable runout disturbance and the received position error signal. At step 806, the generated signal is applied to the servo loop. Applying the generated signal to the servo loop produces a notch in an error sensitivity function S relating the position error signal to a general nonrepeatable runout disturbance, the notch being centered at the frequency of the specified nonrepeatable runout disturbance. Thus, applying the generated signal to the servo loop cancels a component of the position error signal arising from the specified nonrepeatable runout disturbance. In an illustrative embodiment of the present invention, the signal is generated according to EQ. 11.

According to an illustrative embodiment of the present invention, NRRO cancellation filter 654 can be configured "on-the-fly" in the factory or in the field. In this context, "configuring" refers to setting the values of the parameters $\alpha$, $\phi$, $\mu_0$, $\omega_0$ and T.

It will be appreciated by those skilled in the art that conventional generic cascade peaking filters are not scalable and therefore stability is usually not guaranteed. In contrast, the NRRO compensation filter 654 of the present invention achieves frequency scalability via the "loop matching" derived in the time domain using the LMS approach.

In summary, one embodiment of the present invention is directed to a method of canceling nonrepeatable runout position error in a disc drive. Pursuant to the method, a frequency $\omega_0$ of a specified nonrepeatable runout disturbance is determined. A position error signal indicative of a position of a read/write head 116 relative to a track on a disc surface is received. A signal is generated based upon the frequency $\omega_0$ of the specified nonrepeatable runout disturbance and the received position error signal. The generated signal is applied to the servo loop. Applying the generated signal to the servo loop cancels a component of the position error signal arising from the specified nonrepeatable runout disturbance.

In one embodiment of the above method, applying the generated signal to the servo loop produces a notch 708 in an error sensitivity function relating the position error signal to a general nonrepeatable runout disturbance, the notch being centered at the frequency $\omega_0$ of the specified nonrepeatable runout disturbance.

In a further embodiment of the above method, the signal is generated according to the equation:

$$A(z) = \frac{u}{PES} = \frac{z^2\left[\frac{\mu_o}{\alpha}\cos(\phi)\right] - z\left[\frac{\mu_o}{\alpha}\cos(\phi + \omega_o T)\right]}{\frac{z^2}{\eta} - z[2\cos(\omega_o T)] + \eta} \quad \text{(EQ. 11)}$$

where u is the generated signal, PES is the position error signal, z is the z transform, $\mu_0$ is the width of the notch, $\eta$ is the depth of the notch, $\alpha$ is a magnitude of a nominal closed loop gain of the servo loop at the frequency $\omega_0$, $\phi$ is a nominal closed loop phase response of the servo loop at the frequency $\omega_0$, and T is a sampling period.

Another embodiment of the present invention is directed to a disc drive 110 having an actuator 650, a servo controller 652 and a filter 654. The actuator 650 operates in a servo loop to position a read/write head 116 relative to a track on a disc surface. The servo controller 652 receives a position error signal indicative of a position of the read/write head 116 relative to a track on the disc surface and provides a control signal to the actuator 650 based upon the position error signal. The filter 654 receives the position error signal and provides a cancellation signal to the servo loop based upon the received position error signal and a frequency $\omega_0$ of a predetermined nonrepeatable runout disturbance. The compensation signal is adapted to cancel a component of the position error signal arising from the predetermined nonrepeatable runout disturbance.

In one embodiment of the above-described disc drive 110, the cancellation signal is adapted to produce a notch 708 in an error sensitivity function relating the position error signal to a general nonrepeatable runout disturbance. The notch 708 is centered at the frequency $\omega_0$ of the predetermined nonrepeatable runout disturbance.

In an illustrative embodiment of the above-described disc drive, the cancellation signal is calculated according to the Equation 11 set out above.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the nonrepeatable runout compensation of the present invention may be employed in disc drives that use non-magnetic data storage means, for example, optical storage devices, without departing from the scope and spirit of the present invention. Other modifications can also be made.

What is claimed is:

1. A method comprising:
   (a) generating a signal based upon a frequency of a nonrepeatable runout disturbance and a position error signal, wherein the generated signal is capable, when applied to a servo loop, of producing a notch in an error sensitivity function relating the position error signal to the nonrepeatable runout disturbance.

2. The method of claim 1 wherein the notch is centered at the frequency of the nonrepeatable runout disturbance.

3. The method of claim 2 wherein the signal is generated according to the equation:

$$A(z) = \frac{u}{PES} = \frac{z^2\left[\frac{\mu_o}{\alpha}\cos(\phi)\right] - z\left[\frac{\mu_o}{\alpha}\cos(\phi + \omega_o T)\right]}{\frac{z^2}{\eta} - z[2\cos(\omega_o T)] + \eta},$$

where u is the generated signal, PES is the position error signal, z is the z transform, $\omega_0$ is the frequency of the nonrepeatable runout disturbance, $\mu_0$ is the width of the notch, $\eta$ is the depth of the notch, $\alpha$ is a magnitude of a nominal closed loop gain of the servo loop at the frequency $\omega_0$, $\phi$ is a nominal closed loop phase response of the servo loop at the frequency $\omega_0$, and T is a sampling period.

4. The method of claim 1 wherein the generated signal, when applied to the servo loop, produces an anti-notch in an open-loop transfer function of the servo loop at the frequency of the nonrepeatable runout disturbance.

5. The method of claim 1 wherein the generated signal is further based on a magnitude of a nominal closed loop gain of the servo loop at the frequency of the nonrepeatable runout disturbance.

6. The method of claim 1 wherein the generated signal is further based on a nominal closed loop phase response of the servo loop at the frequency of the nonrepeatable runout disturbance.

7. The method of claim 1 and further comprising measuring the frequency of the nonrepeatable runout disturbance off-line.

8. A data storage device comprising:
   a data storage surface;
   a transducer;
   a servo loop adapted to position the transducer relative to the data storage surface; and
   a filter that provides a cancellation signal to the servo loop based upon a position error signal and a frequency of a nonrepeatable runout disturbance, wherein the cancellation signal produces a notch in an error sensitivity function relating the position error signal to the nonrepeatable runout disturbance.

9. The data storage device of claim 8 wherein the notch is centered at the frequency of the nonrepeatable runout disturbance.

10. The data storage device of claim 9 wherein the cancellation signal is calculated according to the equation:

$$A(z) = \frac{u}{PES} = \frac{z^2\left[\frac{\mu_o}{\alpha}\cos(\phi)\right] - z\left[\frac{\mu_o}{\alpha}\cos(\phi + \omega_o T)\right]}{\frac{z^2}{\eta} - z[2\cos(\omega_o T)] + \eta},$$

where u is the cancellation signal, PES is the position error signal, z is the z transform, $\omega_0$ is the frequency of the nonrepeatable runout disturbance, $\mu_0$ is the width of the notch, $\eta$ is the depth of the notch, $\alpha$ is a magnitude of a nominal closed loop gain of the servo loop at the frequency $\omega_0$, $\phi$ is a nominal closed loop phase response of the servo loop at the frequency $\omega_0$, and T is a sampling period.

11. The data storage device of claim 8 wherein the cancellation signal is adapted to produce an anti-notch in an open-loop transfer function of the servo loop at the frequency of the nonrepeatable runout disturbance.

12. The data storage device of claim 8 wherein the cancellation signal is further based on a magnitude of a nominal closed loop gain of the servo loop at the frequency of the nonrepeatable runout disturbance.

13. The data storage device of claim 8 wherein the cancellation signal is further based on a nominal closed loop phase response of the servo loop at the frequency of the nonrepeatable runout disturbance.

14. The data storage device of claim 8 wherein the frequency of the nonrepeatable runout disturbance is measured off-line.

15. The data storage device of claim 8 further comprising a computer storage medium adapted to store the frequency of the nonrepeatable runout disturbance and to provide the frequency to the filter.

16. The data storage device of claim 8 wherein the filter can be configured to cancel a nonrepeatable runout disturbance of substantially any frequency.

17. The data storage device of claim 16 wherein the frequency of the nonrepeatable runout disturbance to be canceled is selectable by a user.

18. A data storage device comprising:

an actuator adapted to position a read/write head relative to a track on a data storage surface; and means for producing a notch in an error sensitivity function relating a position error signal to a nonrepeatable runout disturbance in the position of the read/write head relative to the track on the data storage surface, wherein the position error signal is indicative of the position of the read/write head relative to the track.

* * * * *

UNITED STATES PATENT AND TRADEMARK OFFICE
CERTIFICATE OF CORRECTION

PATENT NO. : 6,636,376 B1
APPLICATION NO. : 09/689312
DATED : October 21, 2003
INVENTOR(S) : Hai T. Ho Page 1 of 1

It is certified that error appears in the above-identified patent and that said Letters Patent is hereby corrected as shown below:

Col. 6 line 15

Equation 2, change "$u(k)=a(k)\cos((\omega_o kT)+b(k)\sin(\omega_o kT)$"

to -- $u(k)=a(k)\cos(\omega_o kT) + b(k)\sin(\omega_o kT)$ --.

Col. 7 line 27

Equation 10, change "$\phi=\arg\{P(e^{j\omega T})S(e^{j\omega T})\}|_{\iota 07 = \omega_o}$ "

to -- $\phi=\arg\{P(e^{j\omega T})S(e^{j\omega T})\}|_{\omega=\omega_o}$ --.

Signed and Sealed this

Thirteenth Day of October, 2009

David J. Kappos
*Director of the United States Patent and Trademark Office*